(12) United States Patent
Pullen et al.

(10) Patent No.: US 6,195,869 B1
(45) Date of Patent: Mar. 6, 2001

(54) METHOD OF APPLYING A RETENTION RING TO A DISC ROTOR ASSEMBLY

(75) Inventors: Keith Robert Pullen; Arnold Fenocchi, both of London; Justin Arthur Hall, Surrey; Mohammad Reza Etemad, London, all of (GB)

(73) Assignee: Turbo Genset Company (GB)

( * ) Notice: Subject to any disclaimer, the term of this patent is extended or adjusted under 35 U.S.C. 154(b) by 0 days.

(21) Appl. No.: 09/242,235

(22) PCT Filed: Aug. 5, 1997

(86) PCT No.: PCT/GB97/02117
§ 371 Date: Jun. 21, 1999
§ 102(e) Date: Jun. 21, 1999

(87) PCT Pub. No.: WO98/06165
PCT Pub. Date: Feb. 12, 1998

(51) Int. Cl.$^7$ .................................................. H02K 15/02
(52) U.S. Cl. .............................. 29/598; 29/732; 29/736; 310/42
(58) Field of Search .............................. 29/598, 732, 733, 29/423, 736; 310/42, 153, 156

(56) References Cited

U.S. PATENT DOCUMENTS

| | | |
|---|---|---|
| 4,759,116 | 7/1988 | Jones . |
| 4,918,802 | 4/1990 | Schaefer . |
| 5,144,735 | 9/1992 | Stark . |
| 5,175,931 * | 1/1993 | Ito .......................................... 29/423 |

FOREIGN PATENT DOCUMENTS

| | | |
|---|---|---|
| 0353042 | 7/1989 | (EP) . |
| 2632788 | 6/1989 | (FR) . |
| 2299217 | 3/1995 | (GB) . |

* cited by examiner

*Primary Examiner*—Carl E. Hall
(74) *Attorney, Agent, or Firm*—Kaplan & Gilman, LLP

(57) ABSTRACT

A retention ring (1) is applied to a disc rotor assembly (3) which comprises a plurality of substantially equiangularly spaced magnets (7). The ring is expanded by driving it over a tapered mandrel (13) onto a rim (5) of the rotor assembly.

16 Claims, 2 Drawing Sheets

METHOD OF APPLYING A RETENTION RING TO A DISC ROTOR ASSEMBLY

The present invention relates to a rotor for a rotary electrical machine such as an electrical generator or electric motor.

British Patent Specification GB 2 222 031 A describes an axial field electrical generator capable of operation at very high speeds. This document describes an axial field electrical generator having a disc rotor with a ring of permanent magnet segments equiangularly spaced around a hub. Engagement with the hub is maintained by means of a pre-stressed hoop. The hoop is formed initially as a push fit and stressed during assembly by expanding the hub by forcing into it, an oversize boss.

As a practical matter, this means of retention has severe disadvantages which have been overcome by the present invention.

Thus, a first aspect of the present invention provides a method of applying a retention ring to a disc rotor assembly comprising a plurality of substantially equiangularly spaced magnets, the method comprising expanding the retention ring by driving it over a tapered mandrel and onto a rim of the rotor assembly.

The complete rotor assembly may be used in any kind of electrical machine which utilizes a disc-type rotor, for example as described in GB 2 222 031 A or in the applicants' co-pending UK patent application No. 9123576.2 (GB 2 261 327 A). In such machines, usually a plurality of the rotors are spaced apart along a drive shaft, interspersed by thin annular stators.

Prior to fitment of the retention ring, it is preferred for the magnet to be maintained in position on a hub of the rotor by a temporary retention means, for example a temporary holding ring located over the rim of the rotor. It is also preferred to provide a second (outer) containment ring slidably located over the temporary holding ring, outside the tapered mandrel by means of push fit. When the retention ring is driven over the mandrel, the retention ring can then displace the outer containment ring so that the retention ring grips the temporary holding ring, and hence the rim of the rotor, through the mandrel by means of interference fit.

It is also convenient to support the retention ring on a slidable support means, for example a slidable support ring between itself and the tapered mandrel. The slidable support ring can then be driven over the rotor together with the retention ring so that it is trapped between the mandrel, the inner ring and the rotor itself.

After assembly, the temporary retention ring and slidable support ring can be machined smooth so that they do not obstruct the rotor in use.

The slidable support ring is preferably rested on a driver means such as a hollow driver cup partially surrounding the mandrel. Normally, the ring and driver means is acted upon by one part of a ram, for example mechanical or hydraulic, and a second part of the ram acts on the mandrel.

The present invention will now be explained in more detail by the following non-limiting description of a preferred embodiment and with reference to the accompanying drawings, in which.

Figure 1:
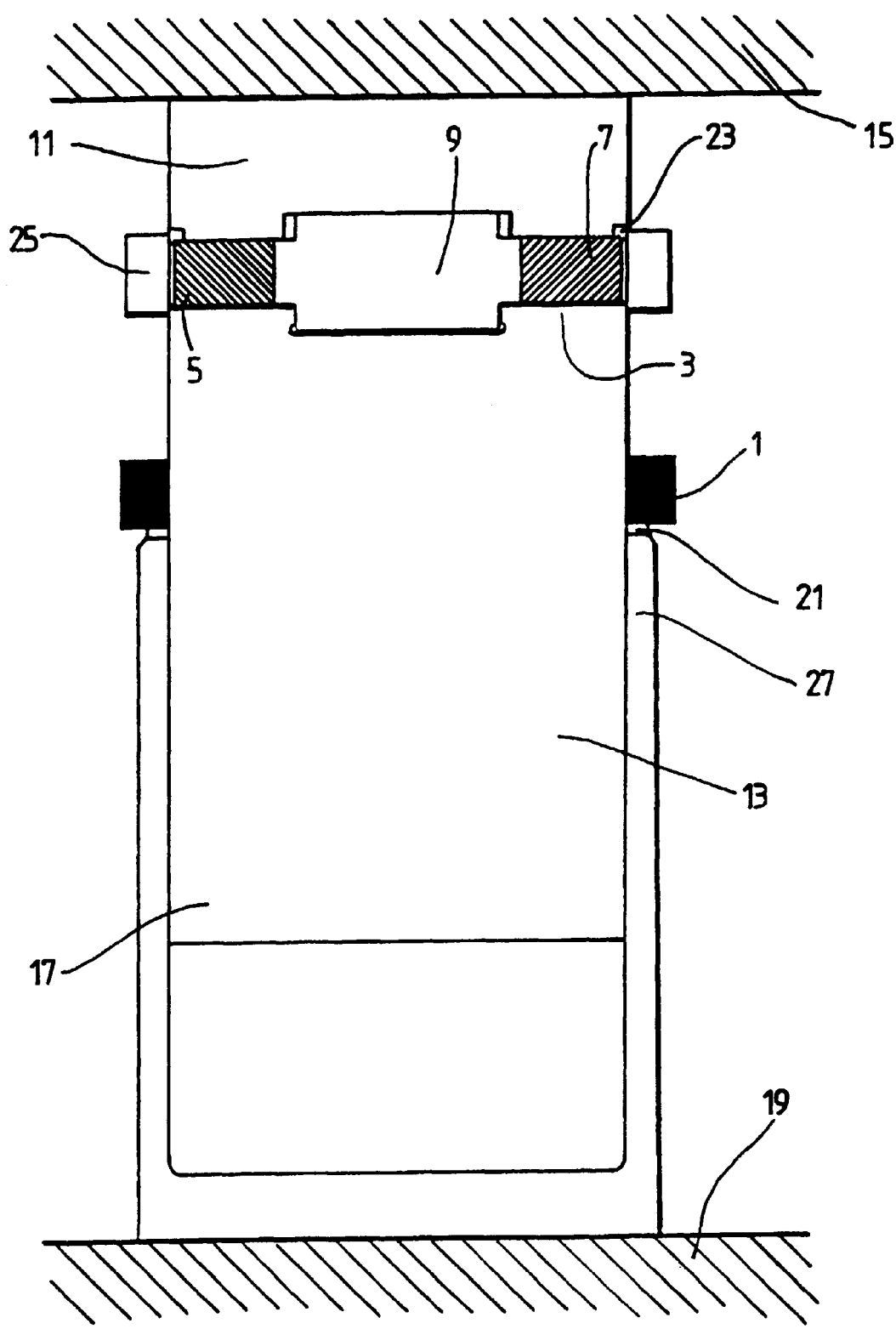
FIG. 1 shows a tapered mandrel arrangement for effecting a method of fitting a retention ring in accordance with the present invention.

As shown in the drawings, a retention ring 1, preferably wound from carbon fibres, is to be fitted over a disc rotor 3 having a rim 5. The rotor comprises a plurality of substantially equi-angularly spaced magnets fitted on a spider 9.

Referring now to FIG. 1, prior to assembly the rotor is located within an upper (wider) part 11 of a tapered mandrel 13. The upper part of the mandrel is in contact with one half 15 of a mechanical or hydraulic ram operated press. A lower (narrower) part 17 of the mandrel faces a second half 19 of the ram, spaced apart therefrom.

The retention ring 1 is supported concentrically on the mandrel 13 by means of a slidable concentric metal support ring 21 over which it is located by means of a push fit. Initially, the retention ring and support ring are a loose fit over the mandrel, approximately two thirds down the length thereof. The magnets of the rotor are held on the spider 9 by means of a temporary holding inner metal ring 23 also concentric with the mandrel. A containment ring 25 outside the mandrel surrounds the inner ring 23 and the rim 5 of the rotor. The containment ring 25 prevents the inner ring 23 from buckling as the retention ring and support ring are driven over it, as described below.

The support ring 21 is supported by a hollow driver cup 27 surrounding the lower part 17 of the mandrel. The base 29 of the driver cup is in direct contact with the second half 19 of the ram.

Figure 2:
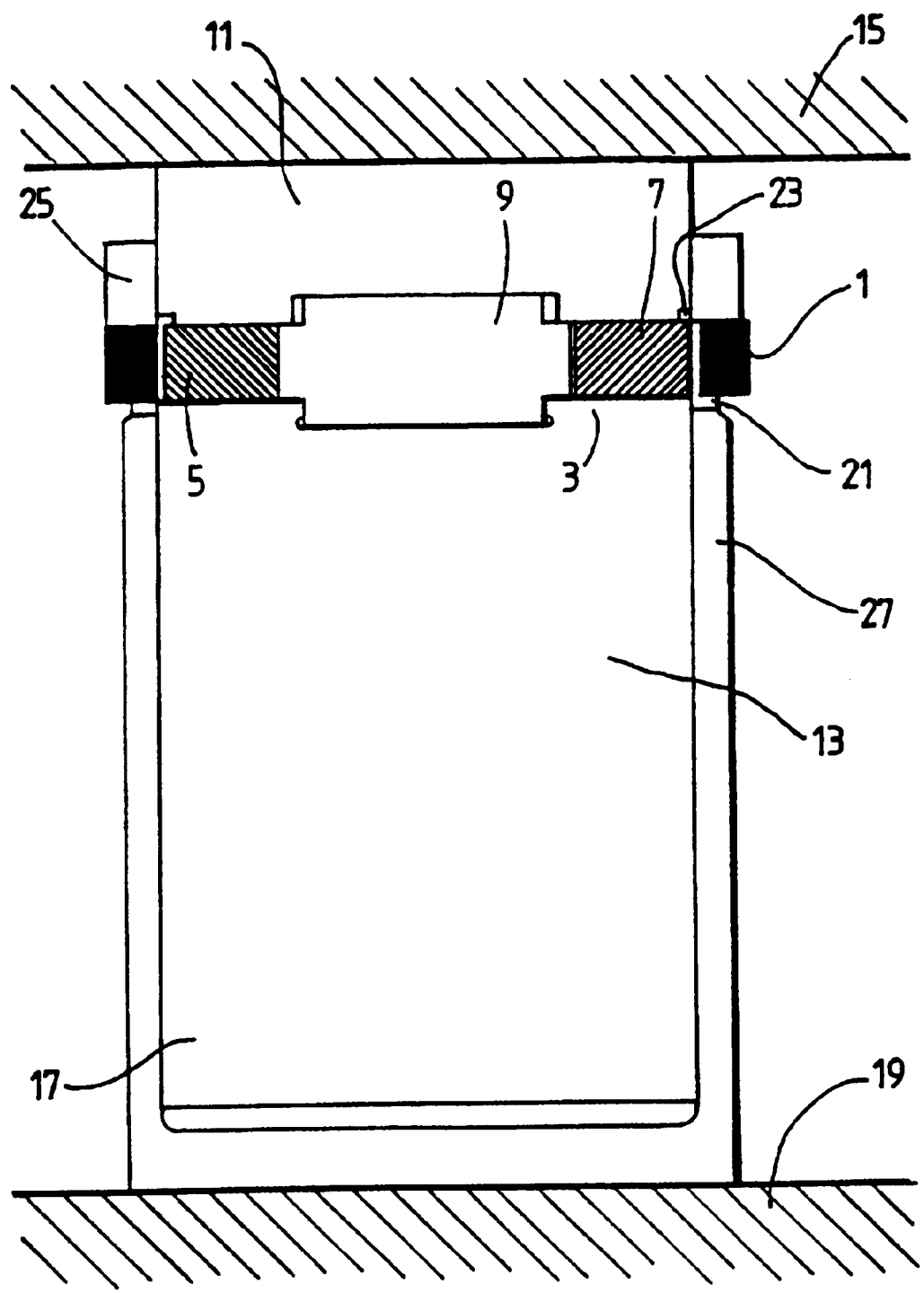
FIG. 2 shows the arrangement of FIG. 1 with the retention ring over the rotor prior to removal from the mandrel.

As shown in FIG. 2, actuation of the ram to bring the two halves 15, 19 of the ram closer together causes the support ring 21 and with it the retention ring 1, to travel over the mandrel 14 towards the wider part 11 until the containment ring is upwardly displaced. The containment ring is dimensioned to slide freely over the wider part 11 in order not to impede positioning of the retainment ring 1 over the rim 5. The retention ring 1 and support ring 21 then grip the inner ring and rim 5 of the rotor through the mandrel.

The assembled rotor is then cut free of the mandrel and support ring 21 and inner ring 23 are machined down prior to assembly of the rotor into an electrical machine so that the rotor does not have protrusions which would interfere with the stator(s) thereof.

In the light of this disclosure, modifications of the described embodiment, as well as other embodiments, all within the scope of the present invention as defined by the appended claims, will now become apparent to persons skilled in the art.

What is claimed is:

1. A method of applying a retention ring to a disc rotor assembly comprising a plurality of substantially equiangularly spaced magnets, the method comprising
    supporting the retention ring on a slidable support, the slidable support located between the retention ring and a tapered mandrel; and
    expanding the retention ring by driving the slidable support and the retention ring over the tapered mandrel and onto a rim of the rotor assembly.

2. A method according to claim 1, wherein the magnets are maintained in position on a hub of the rotor prior to fitment of the retention ring by temporary retention means.

3. A method according to claim 2, wherein the temporary retention means comprises a temporary holding ring located over the rim of the rotor and an outer containment ring slidably located over the temporary holding ring.

4. A method according to claim 3, wherein the retention ring displaces the outer containment ring so that the retention ring grips the temporary holding ring by interference fit.

5. A method according to claim 1, wherein the retention ring is driven over the tapered mandrel by a ramming mechanism.

6. A method according to claim 5, wherein the retention ring is connected to the ramming mechanism driver means.

7. A method according to claim 5 or claim 6, wherein the ramming mechanism is a mechanical or hydraulic ram.

8. A method according to claim 6 wherein the driver means is arranged to act on the slidable support and the slidable support is a slidable support ring.

9. A method according to claim 8 wherein the slidable support ring is driven over the rotor to be trapped between the rotor rim and the retention ring.

10. A method according to claim 1 wherein the slidable support is a slidable support ring.

11. A method according to claim 2 wherein the slidable support is a slidable support ring.

12. A method according to claim 3 wherein the slidable support is a slidable support ring.

13. A method according to claim 4 wherein the slidable support is a slidable support ring.

14. A method according to claim 12 wherein after assembly the rotor is removed from the mandrel and the temporary holding ring and slidable support ring are machined smooth.

15. A method according to claim 13 wherein after assembly the rotor is removed from the mandrel and the temporary holding ring and slidable support ring are machined smooth.

16. A method according to claim 10 wherein the slidable support ring is driven over the rotor to be trapped between the rotor rim and the retention ring.

\* \* \* \* \*